B. G. LAMME.
POLYPHASE SYNCHRONOUS MOTOR.
APPLICATION FILED JAN. 7, 1911.
1,158,511.
Patented Nov. 2, 1915.
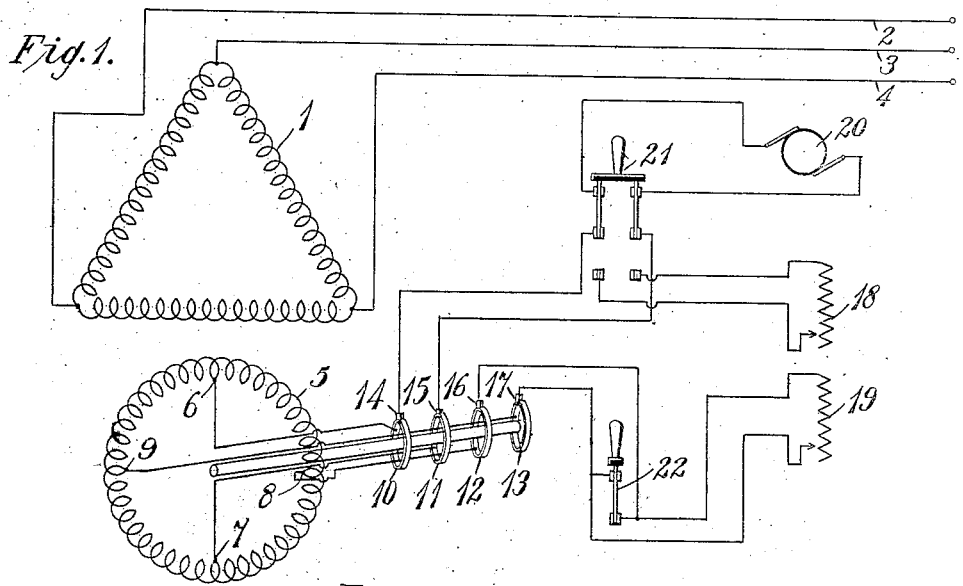
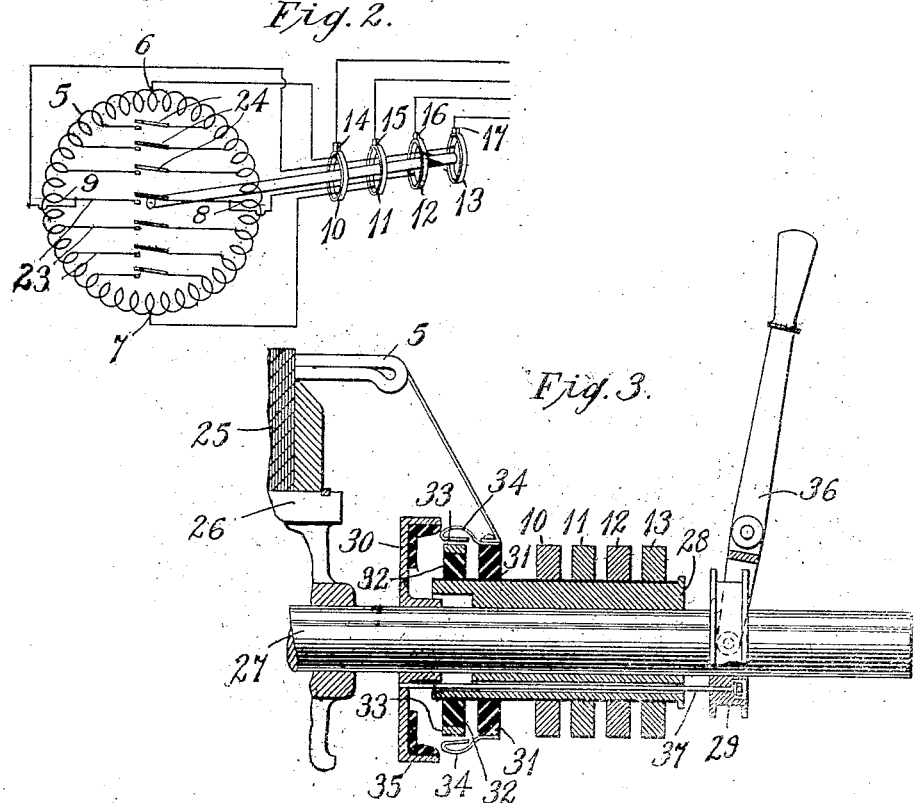
WITNESSES:
INVENTOR
Benjamin G. Lamme
BY
ATTORNEY

UNITED STATES PATENT OFFICE.

BENJAMIN G. LAMME, OF PITTSBURGH, PENNSYLVANIA, ASSIGNOR TO WESTINGHOUSE ELECTRIC AND MANUFACTURING COMPANY, A CORPORATION OF PENNSYLVANIA.

POLYPHASE SYNCHRONOUS MOTOR.

1,158,511.  Specification of Letters Patent.  Patented Nov. 2, 1915.

Application filed January 7, 1911. Serial No. 601,372.

*To all whom it may concern:*

Be it known that I, BENJAMIN G. LAMME, a citizen of the United States, and a resident of Pittsburgh, in the county of Allegheny and State of Pennsylvania, have invented a new and useful Improvement in Polyphase Synchronous Motors, of which the following is a specification.

My invention relates to synchronous dynamo-electric machines and it has special reference to polyphase synchronous motors.

The object of my invention is to provide a machine of the class above indicated that shall operate satisfactorily and which, at the same time, shall have the starting characteristics of a polyphase induction motor.

Self-starting synchronous motors are well known and have been in general use for a number of years. They are usually started by supplying polyphase alternating currents to the armature winding, the field structures being so designed that they will act as induction motor secondaries and give the desired starting torques. The field structure is usually arranged with a distributed type of grid or cage winding which acts as a damper at synchronous speed and as a starting winding while the motor is being accelerated. The field winding proper renders little or no assistance in starting, as it is equivalent to a single phase winding. Each of the arrangements just referred to is open to the objection that it is necessarily a compromise of the best starting, synchronizing and operating conditions. If a cage winding of very high resistance is employed, the starting conditions will be improved, but the motor will have considerable slip at full speed as an induction motor and, consequently, there is more difficulty in pulling it into synchronism. Furthermore, the winding is inferior as a damper under operating conditions by reason of its high resistance. In order to avoid these difficulties, I provide a distributed field winding, making this member of the machine similar to an ordinary direct current armature of the two circuit or series type, the exciting circuit being connected to points in the winding which are electrically separated by 180 degrees. A pair of equi-potential points, preferably midway between the points to which the exciting circuit is connected, are also brought out through collector rings. At starting, both pairs of diametrically opposite points are connected through external resistance, thereby producing a true polyphase induction motor with a symmetrical secondary winding that is closed through external resistances. When maximum speed is attained, direct current exciting current is supplied to one group of collector rings, thereby producing synchronous characteristics in the machine. In addition to the foregoing, I prefer to employ a simple damper, more fully described hereinafter, for the purpose of preventing hunting.

My invention is illustrated in the accompanying drawings, Figure 1 of which is a diagrammatic view of the windings and circuit connections for a machine arranged in accordance therewith. Fig. 2 is a similar view of a modified field winding showing the damper which forms a part of my invention, and Fig. 3 is a sectional elevation of a suitable structure for effecting the circuit changes that are indicated diagrammatically in Fig. 2.

Referring to Fig. 1 of the drawings, the armature winding 1 of a synchronous motor may be supplied with polyphase alternating current energy from any suitable source, such as three phase line conductors 2—3—4. The field magnet winding 5 of the same machine is of the continuous or closed-circuit type and, as shown, is provided with four taps 6, 7, 8 and 9 that are separated by approximately 90 electrical degrees. It is, of course, immaterial whether the armature or the field member rotates but, in accordance with the more usual arrangement, it is assumed that the field member is the rotatable and the armature the stationary part of the machine. The points 6, 7, 8 and 9 are connected to collector rings 10, 11, 12 and 13 which are respectively provided with stationary contact brushes 14, 15, 16 and 17. A variable resistor 18 is connected between the brushes 14 and 15 and a variable resistor 19 is connected between the brushes 16 and 17. The exciter generator 20, which may be replaced by any suitable source of direct current energy, is also connected between the brushes 14 and 15, a double-pole double-throw switch 21 being provided for the purpose of selecting between the resistor 18 and the exciter 20. A switch 22 is adapted, when closed, to short-circuit the resistor 19. For starting the motor from rest, the switch 21 is thrown into such position as to insert the resistor 18, the switch 22 is opened to insert the resistor 19 and the armature winding 1 is connected to the polyphase alternating supply circuit in the usual manner. The connections of the motor are such that it will start readily as a polyphase induction motor having resistance in its secondary circuit and its speed may be increased substantially to that of synchronism by gradually reducing and finally short-circuiting the resistors 18 and 19. When synchronous speed is attained, the switch 21 is reversed in position to connect the direct current generator 20 across the taps 6 and 7 of the field winding. The switch 22 may be closed, thereby establishing a low-resistance cross connection between the points 8 and 9 which are at equi-potential points in the winding. The motor is thus operated as a synchronous motor, the starting resistors 18 and 19 being entirely excluded and having no detrimental effect on the normal operation of the machine.

Referring to Fig. 2 of the drawings, an alternate form of field winding is here illustrated, like parts being designated by the same reference characters as in the other figures of the drawings. In addition to the taps 6, 7, 8 and 9, which are connected to the slip rings as before, I provide a series of cross connections 23 which join equipotential points in the winding, when considered as the field winding of a synchronous motor, and are open circuited while the machine is being started as a polyphase induction motor. Each of the cross connections 23 is provided with a switch 24 which may be of any suitable form.

In Fig. 3 of the drawings, I have illustrated a structure which is suitable for effecting the opening and closing of the cross connections when the field member is the rotating part of the machine, but I do not wish to be limited to any specific means for accomplishing this purpose. Referring to Fig. 3, a magnetizable core member 25 is supported on a spider 26 and is provided with a closed-circuit winding which is indicated in the other figures by the reference character 5. The spider 26 is mounted on a shaft 27 which also supports a sleeve 28, a sliding ring 29 and a sliding contact-closing member 30. The slip rings 10, 11, 12 and 13 are mounted on and are insulated from the sleeve 28, to which a pair of insulating rings 31 and 32 are also secured. A set of contact segments 33 is secured to the outer surface of the ring 32 and a corresponding set of contact fingers 34 is secured to the ring 31 to project over the segments 33 of the ring 32. The contact-closing member 30 is in the form of a disk having a flange 35 which is adapted to force the fingers 34 into engagement with the corresponding segments 33 when the member 30 is axially adjusted on the shaft 27. This adjustment may be effected in any suitable way, a well known means comprising the sliding ring 29, an actuating lever 36 and one or more connecting rods 37 being illustrated. The contact fingers 34 are connected to suitable taps in the field winding, as indicated in the diagram of Fig. 2.

When the equi-potential points of the two-circuit winding are connected and the machine is operating as a synchronous motor, the connections serve the function of a damper and effectively prevent hunting and other trouble which dampers are designed to overcome.

My invention is not restricted to the use of a two-circuit winding for the field of the synchronous motor or to the use of the specific damping means here shown and described, and I desire that only such limitations shall be imposed as are indicated in the appended claim.

I claim as my invention:

A synchronous motor comprising a distributed field magnet winding, resistor sections connected across pairs of diametrically opposite taps in said winding for starting and means for connecting one pair of said taps to a source of unidirectional current and for short-circuiting the resistor section corresponding to the other pair of taps for normally operating the motor.

In testimony whereof, I have hereunto subscribed my name this 29th day of Dec., 1910.

BENJ. G. LAMME.

Witnesses:
C. E. WILSON,
B. B. HINES.